(12) United States Patent
Pitters et al.

(10) Patent No.: US 9,102,190 B2
(45) Date of Patent: Aug. 11, 2015

(54) METHOD OF FABRICATING NANOTIPS WITH CONTROLLED PROFILE

(71) Applicants: NATIONAL RESEARCH COUNCIL OF CANADA, Ottawa (CA); THE GOVERNORS OF THE UNIVERSITY OF ALBERTA, Edmonton (CA)

(72) Inventors: Jason L. Pitters, Edmonton (CA); Radovan Urban, Edmonton (CA); Robert A Wolcow, Edmonton (CA)

(73) Assignees: National Research Council of Canada, Ottawa, Ontario (CA); The Governors of the University of Alberta, Edmonton, Ontario (CA)

(*) Notice: Subject to any disclaimer, the term of this patent is extended or adjusted under 35 U.S.C. 154(b) by 0 days.

(21) Appl. No.: 14/346,752

(22) PCT Filed: Sep. 26, 2012

(86) PCT No.: PCT/CA2012/000878
§ 371 (c)(1),
(2) Date: Mar. 24, 2014

(87) PCT Pub. No.: WO2013/044352
PCT Pub. Date: Apr. 4, 2013

(65) Prior Publication Data
US 2014/0231379 A1    Aug. 21, 2014

Related U.S. Application Data

(60) Provisional application No. 61/539,404, filed on Sep. 26, 2011.

(51) Int. Cl.
*B82Y 35/00* (2011.01)
*B44C 1/22* (2006.01)
*G01Q 70/16* (2010.01)
*B82Y 10/00* (2011.01)

(52) U.S. Cl.
CPC ............... *B44C 1/227* (2013.01); *B82Y 35/00* (2013.01); *G01Q 70/16* (2013.01); *B82Y 10/00* (2013.01); *H01J 2237/2818* (2013.01); *H01J 2237/3174* (2013.01); *H01J 2237/31749* (2013.01); *Y10S 977/888* (2013.01)

(58) Field of Classification Search
CPC combination set(s) only.
See application file for complete search history.

(56) References Cited

U.S. PATENT DOCUMENTS

| 2006/0214172 A1 | 9/2006 | Hsu et al. |
| 2007/0025907 A1 | 2/2007 | Rezeq et al. |
| 2008/0105539 A1* | 5/2008 | Lyding et al. ............ 204/192.34 |

FOREIGN PATENT DOCUMENTS

EP        2144274 A1    1/2010

\* cited by examiner

*Primary Examiner* — Duy Deo
*Assistant Examiner* — Erin Bergner
(74) *Attorney, Agent, or Firm* — Marks & Clerk; Richard J. Mitchell

(57) ABSTRACT

A nanotip, is fabricated by modifying a precursor nanotip having an apex and a shank by applying an electric field in the presence of a reactive gas to perform field-assisted etching wherein atoms are preferentially removed from the shank by chemical interaction with the reactive gas, and controlling the reactive gas pressure and/or tip voltage to vary the electric field so as to promote field evaporation of apex atoms during fabrication of the nanotip and thereby control the overall profile of the resulting nano-tip. The method permits shaping of the overall tip profile.

20 Claims, 11 Drawing Sheets

METHOD OF FABRICATING NANOTIPS WITH CONTROLLED PROFILE

CROSS REFERENCE TO RELATED APPLICATION

This application claims the benefit under 35 USC 119(e) of U.S. provisional application No. 61/539,404 filed Sep. 26, 2011.

FIELD OF THE INVENTION

This invention relates to the field of nanotechnology, and in particular to a method of fabricating nanotips, and in particular nanotips suitable for scanning probe microscopy such as scanning tunneling and atom force microscopy, as well as for use in electron and ion microscopes for imaging or nanomachining, and a method of rebuilding nanotips in situ.

BACKGROUND OF THE INVENTION

The fabrication and characterization of nano-scale tips is an important issue for scientists seeking maximum information from any of the various scanned probe microscopes. Nano-tips are required for well-defined studies of point contacts to metals or semiconductors as well as for manipulation and examination of atoms, molecules and small particles. Nano-tips are demanded for future multiprobe experiments where limits on probe-to-probe spacing are a direct function of the tip shape, needed as a source of coherent and bright electron beams for high-resolution electron microscopy, required for use as gas field ion sources (GFISs) for scanning ion microscopes (SIMs), and desired for applications involving high resolution AFM (atomic force microscope) and STM (scanning tunneling microscope) imaging and atom scale manipulation for pattern fabrication. In all of these cases, well defined, easily formed, clean and ultra-sharp tips will be advantageous. To our knowledge several techniques have been developed by other researchers to fabricate nano-tips: (1) the deposition technique, (2) the build-up technique, (3) the pseudo-stationary profile technique, (4) the field-surface-melting technique, and (5) the field-enhanced diffusion-growth technique. (6) Apex faceting has also been employed to try to shape nano-tips. Faceting can involve the deposition of additional metals or gas adsorbates following by an annealing procedure. (7) Proprietary process to fabricate a trimer-based or (8) field assisted gas etching.

There has been significant and recent interest in developing nanotips for gas field ion sources (GIFSs) for scanning ion microscopy (SIM) applications. The GFISs rely on principles of field ion microscopy (FIM), which was widely used and studied in the 1960s [E. W. Muller and T. T. Tsong. Field Ion Microscopy. Elsevier, New York, 1969]. In FIM, a sharp tip is placed in a vacuum chamber while high positive bias voltage is applied. When an imaging gas (usually He) is introduced into the chamber, an FIM pattern is observed on a fluorescent screen. A schematic diagram of a typical FIM set up is shown in FIG. 1. Each spot on the fluorescent screen (see FIG. 2) represents an individual ion beam generated by a single surface atom. In SIM, a single surface atomic site is selected by an aperture to be an imaging beam of the microscope. Atomically defined tips are desired for SIM operation to achieve high ion current and brightness since imaging gas is shared among fewer atomic sites.

The GFISs are well suited for imaging as well as for nano-machining application using non-staining ion $He^+$ and $Ne^+$ beams, and are considered for replacement of LMIS (liquid metal ion sources) in FIB (Focused Ion Beam) microscopes in order to perform imaging or nano machining. The LMIS is a very sharp metal tip with a Ga metal coating. At high voltage, Ga ions are emitted. LMISs are currently found in most FIB microscopes and can produce a beam of approximately 5 nm width. Moreover, conventional LMIS-based ion microscopes are primarily used for machining but have the undesired trait of "staining" samples under study with residual gallium. As a result, dual beam electron imaging and ion milling machines are required and most commonly used. A helium-based GFIS microscope will leave little to no residual helium on the sample. A GFIS is also based upon a sharp metal tip but atoms arriving from the surrounding gas phase are ionized and emitted. A microscope based upon GFIS can produce a beam of approximately 1 Angstrom width. An ion beam of neon or argon could be used for nano machining without undesirable staining effect.

There are also a number of advantages SIM offers over conventional SEM including (i) better depth of focus due to a highly collimated ion beam, (ii) better ultimate resolution due to shorter wavelength and lower spherical and chromatic aberrations, and (iii) superior element and surface sensitivity. However, the development of a scanning ion microscope has been hampered by the lack of an acceptable gas field ion source (GFIS). In order to achieve the potential of the SIM, some ideal characteristics of GFISs for SIM need to be achieved: 1) the ion sources must be easy to fabricate, 2) the sources should be readily rebuilt without removal from the microscope, 3) ideally, each rebuild should result in a functionally identical apex structure such that emission properties, including the emission axis, remain unchanged, thereby eliminating the need for substantial gun alignment, 4) the source must support large ion currents and be stable for extended periods of time, and 5) in order to improve performance of the microscope, it is also desirable that angular current intensity of the ion beam be as large as possible to maximize probe current.

The field assisted chemical etching method has been described and involves the adsorption of a gas species, typically nitrogen, on the surface, e.g. tungsten. The adsorption of molecular nitrogen on tungsten surfaces has been thoroughly investigated [T. Tamura and T. Hamamura, Surf. Sci. 95, L293, 1980]. It has been found that several adsorption states are formed; among these is the "strong-bond" state. This state arises from the dissociation of $N_2$ on the tungsten surface followed by diffusion into the top atomic layer of W. This causes a protrusion of W atoms, which results in a weak surface structure. Early FIM studies of nitrogen gas on tungsten tips found that the nitrogen reaction only occurs in low field regions, where it can penetrate the ionizing barrier. K. D. Rendulic and Z. Knor [Surf. Sci. 7, 205, 1967] also showed that when a W tip was exposed to nitrogen gas, holes developed on the (111) and (001) planes, resulting from the removal of W atoms. This corrosive reaction of nitrogen was explained as follows: the protrusion of W atom from the metal surface, caused by the adsorption of $N_2$, leads to an enhanced electric field, which becomes adequate to ionize and then evaporate the protruding W atoms. [G. Cranstoun, J. Anderson, Surface Science v 35, p 319. 1973].

U.S. Pat. No. 7,431,856 covers the fabrication of nanotips using a field assisted etching process to create single atom tips. Once this process was made public, other gases have also now been used to create nanotips through the chemical assisted field induced etching mechanism. Oxygen has been shown to be viable etchant gas for the creation of nanotips and a constant voltage etching method has been described for the creation of nanoprotrutions [Y. Sugiura et al. e-J. Surf. Sci.

Nanotech. Vol. 9 (2011) 344-347]. Water has also been found to aggressively etch tungsten tips and has been used with a constant voltage etching method for the preparation of tips for field emission studies [Jo Onoda, Seigi Mizuno. Applied Surface Science 257 (2011) 8427].

U.S. Pat. No. 7,431,856, the contents of which are herein incorporated by reference, describes a method of fabricating SATs (Single Atom Tips) using field-assisted ion etching. There remain, however, some outstanding issues. In particular, it would be desirable to develop a method to prepare SATs with different global shapes. The global shape is an important parameter since it controls beam divergence angle of charged particle beams as well as modifies tip-sample interactions in scan probe applications. For instance, (i) in the SIM application and ion beam generation, the ability to increase the angular current intensity (brightness), ideally using a SAT on a broad base, is important in order to improve the microscope performance. (ii) In point-projection electron holography a divergent electron beam, such as obtained from a tall, narrow tip, is desirable to improve resolution. (iii) In scan probe microscopy (e.g. AFM) various shaped tips provide different advantages via shape dependent tip-sample interactions.

In an operating SIM, SAT ion sources fail over time. It would also be desirable to prepare and subsequently rebuild SATs in situ with a consistent tip position/beam orientation so as to maintain the existing alignment. This ensures identical emission character with respect to peak angular emission. Such source emission angle consistency eliminates the requirement of gun realignment. The development of an acceptable SAT for operation with gas supplies other than helium, including neon, would also be useful.

Trimer tips have found a commercial application and offers reasonable structural stability and robustness. However, W (111) trimer-based GFISs may require elaborate alignment procedure to select one of the three ion beams. Moreover, all three atomic sites at the tip apex have to share helium gas supply, limiting the potential current. As well, poor stability while creating neon ion beams, crucial for performing ion milling (machining) at the nanometer scale, has been observed. On the other hand, single atom tips (SATs) allow all available imaging gas atoms to be ionized at the single apex atom offering the largest ion current per atom. Also, the nitrogen assisted etching and evaporation process provides that every subsequent tip rebuilding process results in the SAT with the exact same apex atom lateral placement and orientation and can prepare stable beams of neon for imaging and nanomachining.

SUMMARY OF THE INVENTION

According to one aspect of the invention there is provided a method of fabricating a nanotip, comprising modifying a precursor nanotip having an apex and a shank by applying an electric field in the presence of a reactive gas to perform field-assisted etching wherein atoms are preferentially removed from the shank by chemical interaction with the reactive gas; and controlling the reactive gas pressure and/or tip voltage to vary the electric field so as to promote field evaporation of apex atoms during fabrication of the nanotip and thereby control the overall profile of the resulting nanotip. In one embodiment, the process takes place within a FIM to permit real time imaging of the tip during fabrication. The tip voltage can be ramped down as the etching progresses at a controlled rate.

There are two distinct mechanisms for removal of atoms during the fabrication of sharp tips in accordance with embodiments of the invention: field evaporation and field-assisted etching. The inventors have discovered that by making use of both mechanisms they are able to control the overall shape of the final tip. Pure field-assisted etching results in sharp long tips, but field-assisted etching in association with some field evaporation results in shorter tips with more flat shoulders. The use of both parameters thus results in an additional degree of freedom, giving much greater control over the final shape of the nanotip.

The novel process thus uses the gas-etching method to shape the tip apex together with (simultaneous and sequential) field evaporation to gain an additional shaping degree of freedom. As a result, it is possible to prepare a range from high to low aspect ratio SATs on large hemispherical bases.

In one embodiment the precursor nanotip is made by placing an electrochemically etched tip in a vacuum chamber and degassing it to remove surface contaminants. The tip apex is subsequently field evaporated to a predefined tip voltage. The apex is further shaped by introducing the etchant gas and cycling the applied field voltage between a field evaporation mode and an etching mode. This technique produces broad round tips with consistent radii and free of defects that make reproducible starting points for fabricating SATs.

The SATs prepared using the above novel method have been proven to have an improved stability, compared to a trimer tip, while creating neon ion beams. The fabrication process may be monitored by field ion microscopy as discussed in U.S. Pat. No. 7,431,856.

As noted the nanotip can be fabricated within a FIM, in which case the tip can be imaged during the fabrication process. Different imaging gases (with different ionization energies) are used in order to obtain required structural information during the tip formation process. The information provided by this new mode of structural monitoring is an important component the novel fabrication process as it enables previously impossible evaluation of overall tip shape. It also allows the tip fabrication process to be automated by using, for example, pattern recognition techniques.

It will be observed that the control of both the etching and field evaporation parameters results in an improved ability to control the overall shape and sharpness of the tip.

SATs fabricated by, and rebuilt by, the above procedure have consistent alignment of the emitted ion beam with the microscope axis. This fact removes the requirement to realign the ion source with each tip rebuild. More importantly, it significantly reduces the complexity of the ion gun design leading to improved performance and reduced costs. This can remove a significant amount of downtime while realignment occurs.

An embodiment of the invention provides a method to produce and repair tips in situ in a SIM or FIM, preferably with a rapid automatic procedure. Thus, a second aspect of the invention provides a method of rebuilding nanotips within a SIM or FIM comprising introducing an etchant gas into a vacuum chamber of the SIM or FIM with a nanotip in situ; etching the nanotip having an apex and a shank in the presence of an electric field to preferentially etch the shank while maintaining tip alignment within the microscope; and varying the tip voltage to promote or inhibit field evaporation of apex atoms in order to control the overall profile of the final tip.

The automation is computer controlled and can be customized to prepare tips of various shapes. Automation takes control over all applied voltages and the gas delivery system and allows the etching and shaping processes to occur more rapidly than procedures without automation, thereby reducing demand for skilled operators and reducing operation costs and increasing accessibility of the instrument incorporating the new source and build method.

Another embodiment of the invention involves the coating of the shank of the tip in order to improve the thermal accommodation of the gas atoms. Arriving gas atoms have excess kinetic energy causing repeated bouncing and landing on the tip surface. That process inhibits arriving atoms serving as feed atoms to the ionization process. The elemental identity of the atoms constituting the tip surface can affect the rate of incoming gas atom cooling. By cooling the gas molecules as fast as possible (thermal accommodation), we believe that the overall brightness of the ion beam is improved compared to untreated tips.

Another embodiment of the invention involves the coating of the shank of the tip in order to improve the robustness of the emitting tip against reaction from gas contaminants. It is important to protect the tip from reaction in order to maintain a consistent shape during operation. This increases the operation lifetime of the tip.

The coating can be nitrogen, but also other coatings, such as oxygen could be used.

Initial tip fabrication can be done in a custom tip-making apparatus. This is made possible thanks to nitrogen passivated layer which protects the apex from significant degradation when exposed to ambient conditions. Appropriate heating procedure designed to degas the tip is required after reinsertion into vacuum chamber and/or working instrument. Tip rebuilds can be done in the working instrument (e.g. SIM) where the tip is installed. Tips need not be removed from the working microscope when subsequent rebuilds are required.

The last embodiment of the invention includes additional heating step of either a precursor nanotip or a SAT in order to further modify overall tip shape. In this step, the tip is heated to higher temperature than in a degasing step (typically 1400 deg C.) for several minutes (usually 60-120 s) to promote surface diffusion. This process is sometimes referred to as faceting. This fabrication step is primarily designed to increase base tip curvature and increase extraction voltage to improve angular current density and brightness.

In summary, therefore, aspects of the invention provide four main methods to fabricate and improve performance of SATs:

(i) A combined gas etching and field evaporation approach to control overall tip shape of an SAT and therefore control beam opening angle and/or angular current density (source brightness) and in order to maintain a consistent beam alignment in order to avoid the requirement to realign the ion source after each tip rebuild.

(ii) A method of rapid automatic tip etching.

(iii) Tip surface engineering to improve overall ion current and enhance the angular current intensity and stability and longevity of the tip by protecting the tip from undergoing additional reactions. Different tip coatings such as nitrogen are used to promote faster thermal accommodation of incoming imaging gas atoms/molecules. Faster thermal accommodation reduces ion beam divergence and therefore increasing ion current density. In addition, gas capture rate is also improved increasing the helium supply to the apex atom and therefore increasing the total ion current compared to bare metal (tungsten) tips.

(iv) The apex shaping by a heat treatment (annealing) of either a precursor nanotip or a SAT to achieve nanotip faceting in order to further modify overall tip shape and therefore control beam opening angle and/or angular current density (source brightness).

BRIEF DESCRIPTION OF THE DRAWINGS

The invention will now be described in more detail, by way of example only, with reference to the accompanying drawings, in which: —

DETAILED DESCRIPTION OF EXEMPLARY EMBODIMENTS

The invention has been demonstrated in the context of a FIM, which serves as a test system for the development of a gas field ion source to be employed in a scanning ion microscope. In a FIM a sharp tip is placed in an electric field in an ultrahigh vacuum chamber, which is backfilled using an imaging gas such as helium or neon. The curvature of the surface near the tip repels ionized gas atoms in a direction roughly perpendicular to the surface. These repelled ions strike a detection surface and the magnified image formed from the collected ions can be of sufficient resolution to image individual atoms. The FIM allows one to monitor the shape of the tip as the process progresses.

Scanning electron microscopes (SEMs) have been known for some time. In a SEM, a sample is scanned in a raster fashion with an electron beam. In a SIM, the beam of electrons is replaced with a beam of ions, such as helium ions, which is used to generate the image. The FIM used in the present experiments serves as a convenient means of observing the behavior of the nanotip as an ion source, and it is understood that the experimental data/results are valid for the behavior of the tip in a SIM. One of the advantages of the invention is the ability to rebuild an ion source in situ in a SIM.

Figure 1:
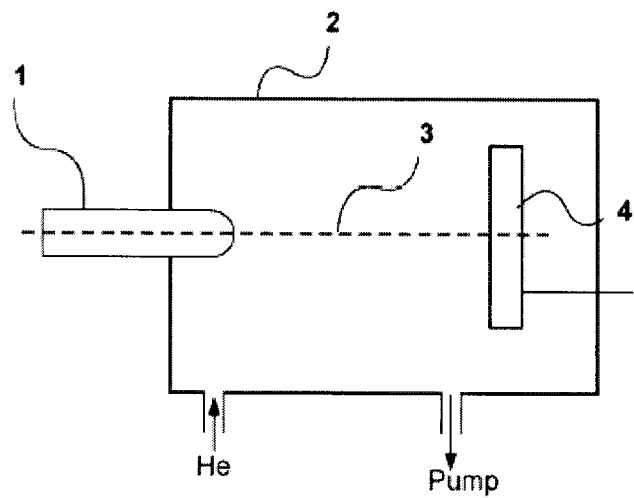
FIG. 1 is a schematic drawing of an FIM.

A typical FIM setup is illustrated in FIG. 1. Tip 1 is mounted in a vacuum chamber 2 along an axis 3 facing an imaging screen 4. A high voltage is applied to the tip generating an electric field. The tip is typically maintained at a temperature of 20-100K. Helium at a pressure of around 10e-4 Torr is maintained in the chamber.

Figure 2:
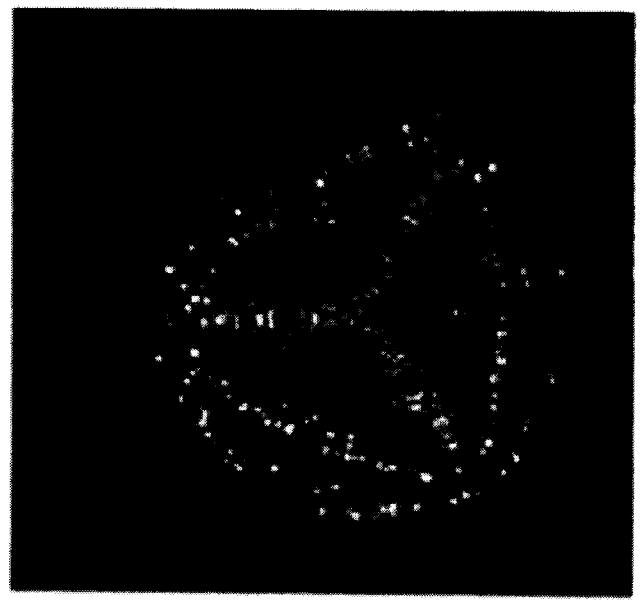
FIG. 2 is an FIM image of a fully field evaporated W(111) tip.

During operation of the FIM, the helium atoms strike the tip, migrate toward the apex from where they become ionized and stream off in a narrow beam toward the screen 4. Experiments were carried out in an ultra high vacuum system with base pressure <1e-10 Torr. A tungsten tip is typically degassed at approximately 900 deg C. for several minutes. This relatively low temperature treatment degasses the emitter while maintaining a sharp tip apex. During FIM observation and nitrogen etching, the tip was cooled via a flow-through cryostat using cold nitrogen gas. A gas manifold was attached to the cryostat that allowed for the mixing of cold (near LN2 temperature) and warm (room temperature) nitrogen gas in order to control the tip temperature. The tip and extractor voltages were controlled and monitored by a computer. The extractor voltage was fixed at −2 kV in these experiments. The FIM pattern was amplified by an MCP (Micro Channel Plate) and recorded using a PixelFly high sensitivity camera. The images presented here are averaged captures to improve signal-to-noise ratio. FIG. 2 shows a typical helium generated FIM pattern of a fully evaporated W(111) tip. The total extraction voltage is +20 kV (+18 kV is applied to the tip and −2 kV is applied to the extractor). The tip radius can be determined by the number of rings n between two crystallographic directions in the FIM image $$R = ns/(1 - \cos \gamma) \qquad (\text{eq. 1})$$

where s is the step height, and γ is the angle between crystal directions. For bcc tungsten with lattice constant a=3.16 Å corresponding s=0.912 Å for W(111). We have chosen [111] and [211] directions to determine tip apex radius. For these directions corresponding 1/(1−cos γ)=17.5 Å. Combining all numbers one gets a simple expression for a tip radius $$R[Å] = 15.96n \qquad (\text{eq. 2})$$

In this particular case (see FIG. 2) one can count nine rings between [111] and [211] directions indicating a tip radius of 144 Å. This is a typical value for electrochemically etched tungsten tips.

Evaluating initial tip radius is very important. As well, the overall tip shape also plays an important role in determining extraction voltage. Therefore, it is crucial to carefully measure apex curvature to ensure consistent starting points. A combination of field evaporation, etching (saw-tooth procedure described above), and/or heating treatment might be necessary to achieve desirable tip radius.

Embodiments of the invention provide techniques for fabricating SATs suitable for use in a FIM or SIM, wherein the same setup can be used with the introduction of nitrogen; techniques for rebuilding worn tips in situ in a microscope; and techniques for improving the imaging performance of a microscope.

Determining the Tips Shape Using Neon Imaging Gas.

One way to make a tip is to use a gas-assisted etching process described in U.S. Pat. No. 7,431,856. This enables the formation of SATs. The applied field is controlled to preferentially etch the shank of the precursor tip. In the described process, the initial radius of the precursor tip is the sole determinant of the global shape of the final product.

The described procedure has now been modified to allow for the controlled shaping of the supporting structure of the SAT by introducing a field evaporation component. In this phase, the tungsten atoms of the tip are selectively removed as a result of the controlled application of the electric field.

The evaluation of a W(111) tip shape during nitrogen-assisted etching has been performed with a FIM using neon imaging gas.

The tip shaping was carried out by nitrogen-assisted etching. The $N_2$ partial pressure was monitored by residual gas analyzer (RGA) and was kept constant at 5e-6 Torr. The FIM pattern was formed by helium imaging gas using 2e-5 Torr. The tip voltage was slowly ramped down under computer control from +18 kV with ramp rate of −3 V/s. The etching events could be seen at the outside edge of the FIM pattern. This is consistent with this etching process: $N_2$ etching gas can only access the tungsten surface if it can penetrate the applied field barrier without being ionized and projected away. If the applied field is controlled properly, the field at the tip apex protects it from nitrogen attack and etching. As etching progresses, the FIM pattern changes (see FIG. 3b). The nitrogen etching creates a sharp circular edge while the central tip region remains rather flat. The resulting electric field at the flat tip apex is not sufficient to ionize helium imaging gas leading to a dark region. There is a very weak indication of an atom being present at the tip apex. As the etching progresses, the ring of atoms contracts (FIG. 3b-c) indicating further etching. The ring in FIG. 3d completely disappears and tip apex atoms become prominent. Subsequent etching further sharpens the tip until the single apex atom remains (FIG. 3e). The SAT is created.

Figure 3:
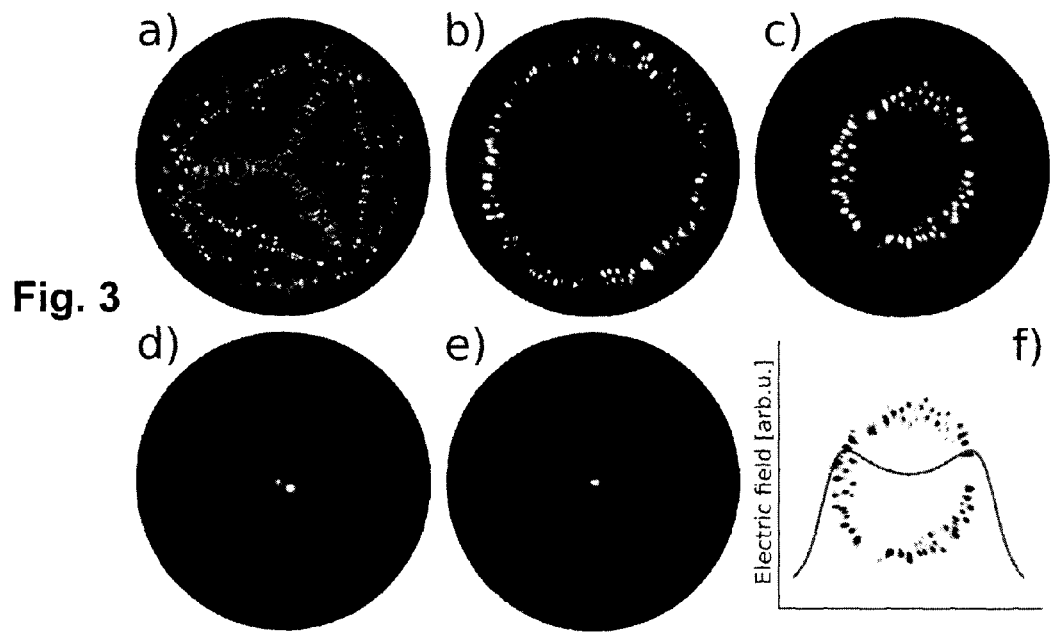
FIG. 3a-e shows various FIM patterns and 3f is a schematic drawing of a field profile.

During the etching procedure, the tip apex becomes dark suggesting a lowered electric field insufficient to ionize helium imaging gas. However, the field is strong enough to ionize nitrogen and other contaminants before they reach the tungsten surface as the tip apex remains unchanged. Nitrogen is rather adsorbed to the tungsten surface far back from the apex and migrates along the tip shank towards the apex in presence of the electric field. As nitrogen molecules reach the high field region at the outside perimeter of the ring structure seen in FIG. 3b, they can react with the tungsten atoms and subsequently etch them away. In this process, the nitrogen molecule is consumed and not available for further reaction. The nitrogen delivery mechanism is supported by the fact that the inner edge of the observed ring in FIG. 3 b,c is not etched. Only the outer edge atoms are removed despite the fact that the field strength is equivalent, indicating an absence of available nitrogen (FIG. 3f).

The flat middle region is further explored using neon as an imaging gas (instead of helium) as seen in FIG. 4b. There are two significant observations: (i) the previously black featureless region reveals clean W(111) crystal structure, (ii) the ring previously seen in the helium image becomes indistinct. The revelation of a previously inaccessible structure of a flat tip apex by introducing neon imaging gas, instead of helium, is related to its lower ionization energy, see Table I.

TABLE I

Ionization energy and best imaging fields for helium and neon imaging gases.

| Gas | Ionization potential [eV] | Best imaging field [V/Å] |
| --- | --- | --- |
| Helium | 24.6 | 4.40 |
| Neon | 21.6 | 3.45 |

This allows neon to ionize over the central tip region which was previously not imaged with helium. At the same time, areas with high field, such as the ring visible in the helium generated image, become indistinct due to excessive ionization far from the tip surface, compromising the image resolution. The image distortion and large ring separation correspond to high tip curvature where the flat tip apex connects to the shank of the etched tip. It is clear that atomic features near {110} planes are the same in both images (see FIGS. 4a and 4b). Since {110} planes are rather flat corresponding to low electric field they do image well with neon even at high voltages. By lowering tip voltage to account for the lower ionization energy of neon imaging gas, the tip apex structure disappears from the neon image; at that point both helium and neon images are nearly identical in appearance. Note, that neon ionization energy is still significantly higher than common vacuum contaminants assuring a clean tip apex.

Figure 4:
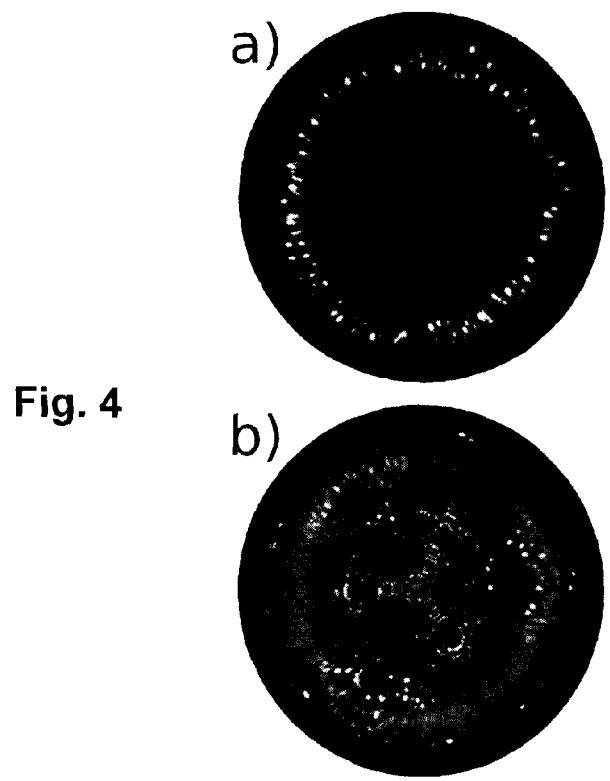
FIG. 4a shows a He-FIM image and 4b is a Ne-FIM pattern of the same tip.
Figure 5:
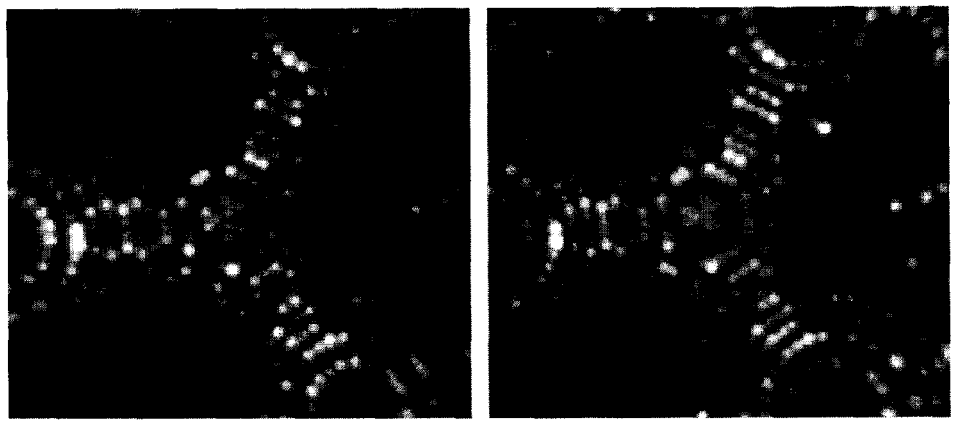
FIG. 5 shows enlarged portions of a helium image.

FIG. 5 compares the structure of the partly etched tip shown in FIG. 4 with the original unetched tip shown in FIG. 3a. Cropped images are shown in order highlight the apex atoms only. It is concluded that although significant etching has occurred between the two images, virtually no atoms have been removed from the apex. This is consistent with the mechanism by which nitrogen is delivered to tungsten etching sites discussed above.

Figure 6:
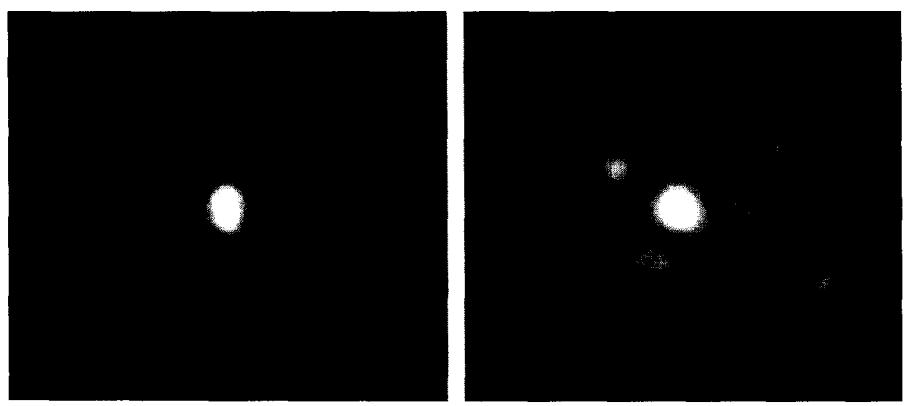
FIG. 6 shows helium and neon images of a SAT recorded at V_tip=6.5 kV.

FIM imaging with low ionization energy gas such as neon also provides valuable structural information of the SAT, see FIG. 6. In the helium generated image, only the apex atom is visible with very minor satellite atoms. No other tip structure information is available until the apex atom is removed by either etching or field evaporation. The tip structure can be reconstructed in this manner, but the tip itself is destroyed. By using neon as the imaging gas, but maintaining the helium best imaging voltage, lower field regions can be observed. FIG. 6 compares both helium (left) and neon (right) images. In this particular case, an asymmetric support structure is revealed. The neon image reveals two layers below the apex atom indicating that electric field distribution around the apex decreases dramatically over only a few atomic layers.

Figure 7:
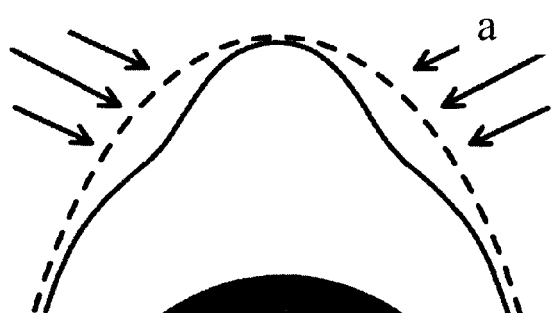
FIG. 7 shows a predicted shape compared with an actual etched shape.
Figure 7:
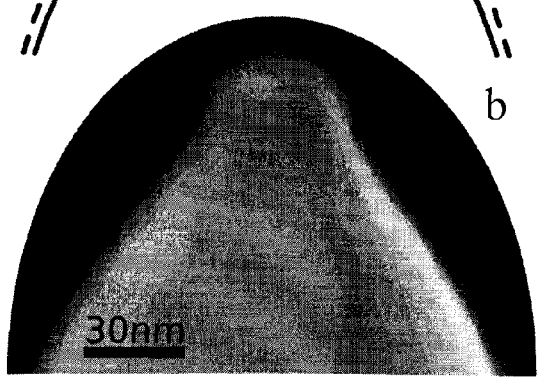

Based on observations using helium and neon imaging gases, the shaping process that occurs during tip etching can be understood. The schematic diagram is shown in FIG. 7a. The etching occurs below the tip apex where the field conditions for etching are satisfied. This creates an etching band which narrows as the etching progresses (indicated by arrows in FIG. 7a), leading to an extended structure that supports the single atom tip. This structural model is confirmed with a scanning electron microscope image in FIG. 7b.

Figure 8:
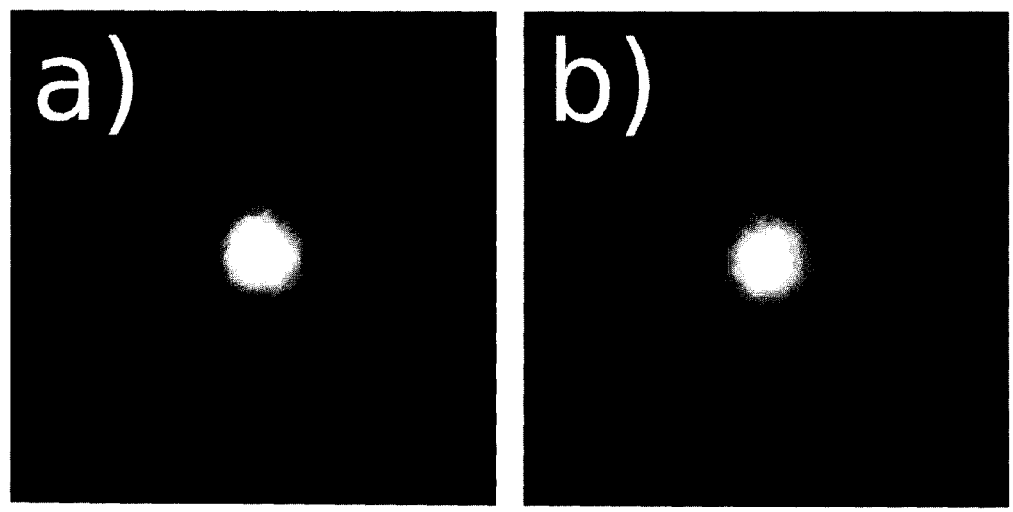
FIG. 8 shows SAT at time zero and after 100 hours of continues operation using He.

SATs prepared by this method were evaluated for their long term helium ion emission stability. The uncorrected helium partial pressure during the measurement was $1\times10^{-5}$ Torr. The total ion current was not determined. FIG. 8 shows two FIM images of the SAT at various stages of the stability test. The images were recorded at time zero after 100 hours of continuous operation. This indicates that SATs prepared in this manner can result in stable and resilient structures.

The above experiments illustrate a nitrogen-assisted etching sequence to prepare an SAT using W(111) single crystal wire. Neon was employed as an imaging gas to reveal tip structure that was invisible to helium. Based on this observation the tip shape during the etching process was determined. It has been shown elsewhere that the apex height above the tip base can be controlled by appropriate etching parameters.

The experimental results demonstrate that nitrogen-assisted etching does not occur at the tip apex. This is consistent with a nitrogen delivery mechanism along the tip shank and not through the gas phase. The sharp edge surrounding the flat tip apex acts as a protector from nitrogen. This can be extended to other contaminants having low ionization energy such as CO or water. The upper flat tip apex could be used as a protected clean tungsten substrate for various studies such as adsorption and diffusion.

Neon Stability of SAT Compared to Trimer Tip.

Figure 9:
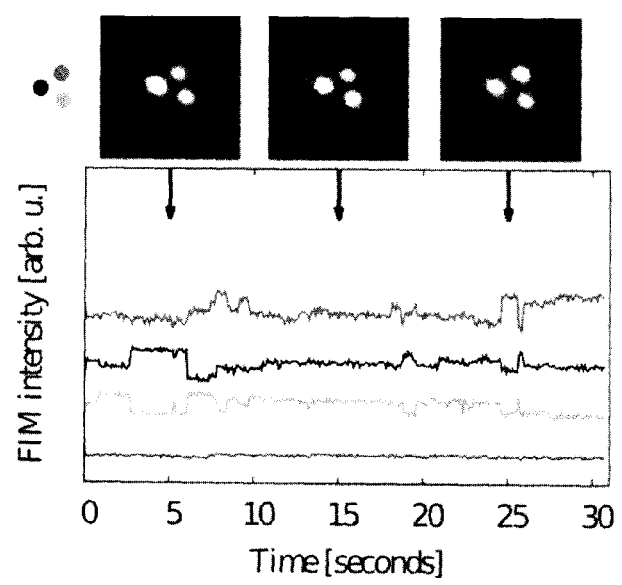
FIG. 9 shows current instability of a trimer tip while using neon gas.
Figure 10:
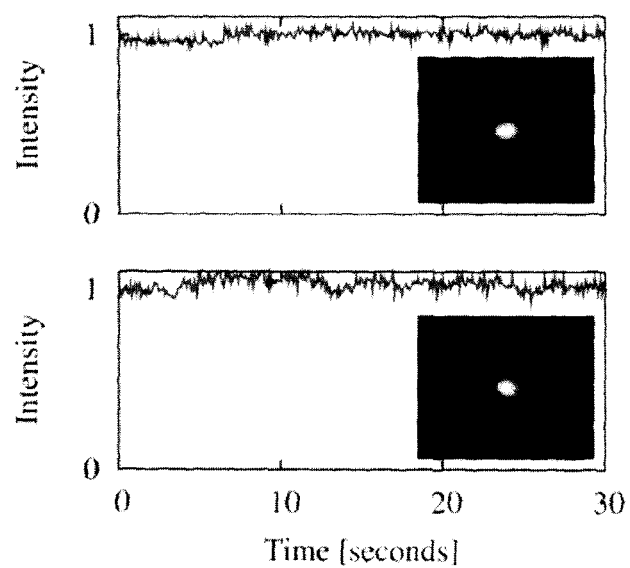
FIG. 10 shows stable helium and neon emission from a SAT.

SATs prepared by this method were evaluated for their long term neon ion emission stability and compared to that of a trimer tip. There are significant differences between helium and neon imaging gases when used with trimer-terminated W(111) tips. While the helium image of a trimer tip appears stable, the neon image displays significant, abrupt changes in ion current from the three individual atomic sites (FIG. 9). This is not desirable for a working SIM, particularly those that select the current from only one such atom, as the flickering beam leads to brightness variations in the image or differing sputtering rates during nanofabrication. The nitrogen and field assisted etched SAT did not exhibit such unstable behavior (FIG. 10). The SAT always generated a stable ion beam for both neon (FIG. 10, lower) and helium imaging gases (FIG. 10, upper). Moreover, neon ion current is comparable to helium one at gas pressures four to ten times lower suggesting large neon current can be generated. SATs formed by nitrogen and field assisted etching process may therefore be suitable for stable neon beam generation. Moreover, SAT provides higher ion current per atom than trimer-based tips for non-staining nanomachining and high resolution imaging.

Controlling the Tip Shape by Modifying the Voltage Rate During the Etching Process.

As previously noted there are two distinct mechanisms for removal of atoms during the fabrication of sharp tips in accordance with embodiments of the invention: field evaporation and field-assisted etching.

Field evaporation as its name implies occurs as a result of atoms being stripped off the tip in the presence of a high electric field, e.g. in the order of 5.5 volts/Å for tungsten. Field evaporation usually occurs at the apex where the field is strongest. This results in the blunting of the tip.

Field-assisted etching is primarily a chemical process wherein the atoms are removed from the tip by the chemical action of an etchant gas, typically nitrogen. In this case, the electric field is highest at the apex (~4.5 volts/Å during imaging/etching) and protects the apex by repelling the nitrogen atoms. As a result the shank is preferentially etched where the field is lower (e.g. in the order of 2 to 3 volts/Å, leading to a sharp tip, including a single atom tip, as shown by the black line in FIG. 11a. U.S. Pat. No. 7,431,856 employs field-assisted etching to create a single atom tip. In field-assisted etching the electric field acts to protect the apex itself leaving the removal of atoms to be primarily brought about by the chemical action of the etchant gas on the shank, which not being a point, is associated with a lower electric field.

In field-assisted etching, as described in U.S. Pat. No. 7,431,856, the applied voltage is lowered during the etching process in order to keep the electric field at the apex constant because as the apex becomes sharper, the field lines at the apex become closer together so that the field strength increases. Unless the voltage is lowered the electric field could rise to the point where field evaporation at the tip will occur, something that the earlier patent seeks to avoid.

The present invention takes advantage of this phenomenon in order to create an additional degree of freedom in the control of the overall tip shape. Some applications require a more pointed tip as shown by the black line in FIG. 11a, which can be achieved in accordance with the teachings of U.S. Pat. No. 7,431,856, whereas some applications require a somewhat flatter tip as shown by the black line in FIG. 11b. By controlling both mechanisms in accordance with the teachings of the invention, it is possible to create tip shapes having different profiles varying from quite sharp, as shown in FIG. 11a, to relatively flat as shown in FIG. 11b. It will be noted in FIG. 11b that some atoms are removed from the tip apex, i.e. the point no longer extends up to the top of the precursor tip as shown by the gray line. The net result is a sharp tip with a flattened profile as shown in FIG. 11b.

It will be appreciated that the two mechanisms can be performed simultaneously or sequentially in separate phases, for example, by cycling between the two mechanisms. As noted, as the field-assisted etching progresses the electric field at the tip will become stronger, in accordance with the invention advantage of this fact can be taken to initiate some field evaporation of the tip leading to a flatter profile.

Also a final step of field-assisted etching, wherein field evaporation is inhibited, may be performed in order to create single atom tips with the desired profile.

In another embodiment, it may be desirable to cycle between field-evaporation and field-assisted etching phases in order to achieve greater control over the final shape of the tip.

In one example, a W(111) tip was etched using a nitrogen etchant field assisted process as described in U.S. Pat. No. 7,431,856 within a FIM. At the start of etching, tip field (voltage) was selected close to the best imaging voltage. The nitrogen etching of the tungsten surface occurs at an applied tip field below a critical value, $V_{crit}$, and above a threshold voltage, $V_{min}$. In case of helium as an imaging gas $$V_{fe} > V_{img} > V_{crit} > V_{min} \quad (eq.\ 3)$$

where $V_{img}$ is the best imaging voltage and $V_{fe}$ is the voltage where field evaporation takes place. $V_{crit}$ is related to the ionization probability of nitrogen molecule while $V_{min}$ corresponds to the lowest electric field to remove (field evaporate) "etched" tungsten atoms. At the start of etching, a tip field (voltage) close to the best imaging voltage is selected. This defines an "etching band" where applied voltage V satisfies $V_{crit} > V > V_{min}$ condition. As etching progresses the tip apex becomes protruded and hence local electric field increases and as a consequence tip voltage has to be lowered to prevent field evaporation of apex atoms ($V_{fe} > V$). The continued lowering of V maintains a "constant field" at the apex, allowing the last atoms to be maintained. Etching/evaporation continues at sharp kinks and eventually the tip apex becomes narrow leaving a single tungsten atom at the apex. This results in high aspect ratio nano-tip on a base tip radius that is largely unaltered. A tip prepared with the "constant field" method is shown in FIG. 11a.

In the alternate method, once the initial nitrogen etching is established, the tip voltage is lowered slowly, apex atoms can field evaporate as the tip sharpens. This "forced evaporation" happens because V approaches $V_{fe}$ as the tip etches. The evaporation leads to a flattening of the overall tip shape. Continued etching and field evaporation will eventually lead to a nanotip with a relatively low aspect ratio and hence high tip operating voltage. The overall shape of the tip can be controlled be varying the nitrogen etch rate through the nitrogen pressure and the rate at which the voltage is dropped. If the voltage is dropped more quickly, nitrogen etching is faster than apex field evaporation and a taller nanotip is formed. If the voltage is dropped more slowly, paused or adjusted through a custom ramping profile, apex atoms are controllably removed and the tip shape will be controlled through a balance of etching and field evaporation. A tip prepared using the "Forced Evaporation" method is shown in FIG. 11b.

Figure 11:
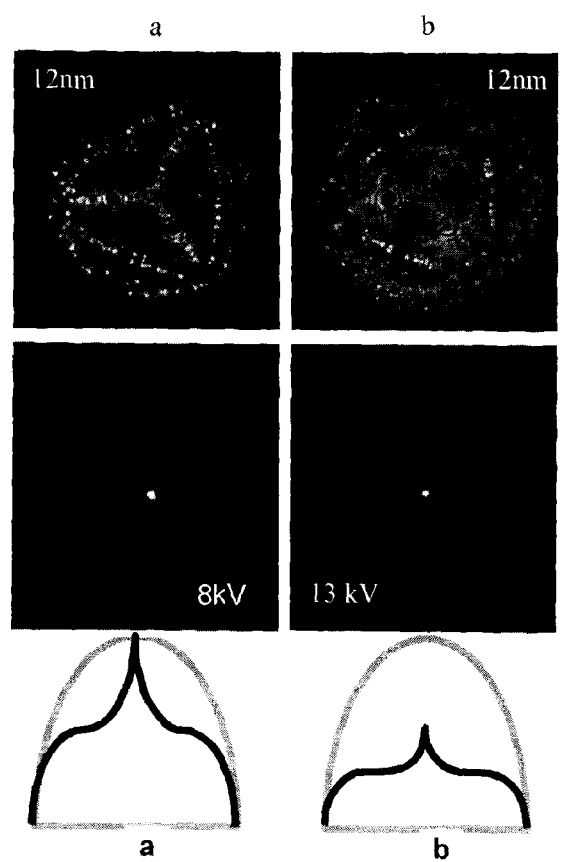
FIGS. 11a and 11b show the characteristics of SATs prepared under different conditions.

FIG. 11 shows two single atom tips prepared by the above methods as well as a schematic of the tip shaping. Both tips started with a measured radius of ~12 nm (estimated from a number of net rings between [111] and [211] directions) and are etched to single atoms. However, the overall tip shapes are substantially different and the final voltages vary greatly, from 8 kV to 13 kV. The 8 kV single atom tip was prepared by maintaining the apex atom during the etching (faster voltage drop) while the 13 kV single atom tip was prepared by a slow voltage drop which allowed field evaporation during the etching process. Although the operating voltages are quite different for each single atom tip, the electric field at the apex atom must be similar as evidenced by the lack of field evaporation.

The initial tip radii in FIGS. 11a and 11b were both 12 nm. In FIG. 11a, the SAT was prepared from a 12 nm field evaporated tip. The etching was performed with a voltage decrease that maintained the last atoms during the etching procedure (constant field). The SAT emitted at 8 kV.

In FIG. 11b, the SAT was also prepared from a 12 nm field evaporated tip. The etching was performed with a slow voltage decrease that allowed for field evaporation of apex atoms during the etching procedure (forced evaporation). This created a broad tip with a small protrusion. The SAT emitted at 13 kV.

Figure 12:
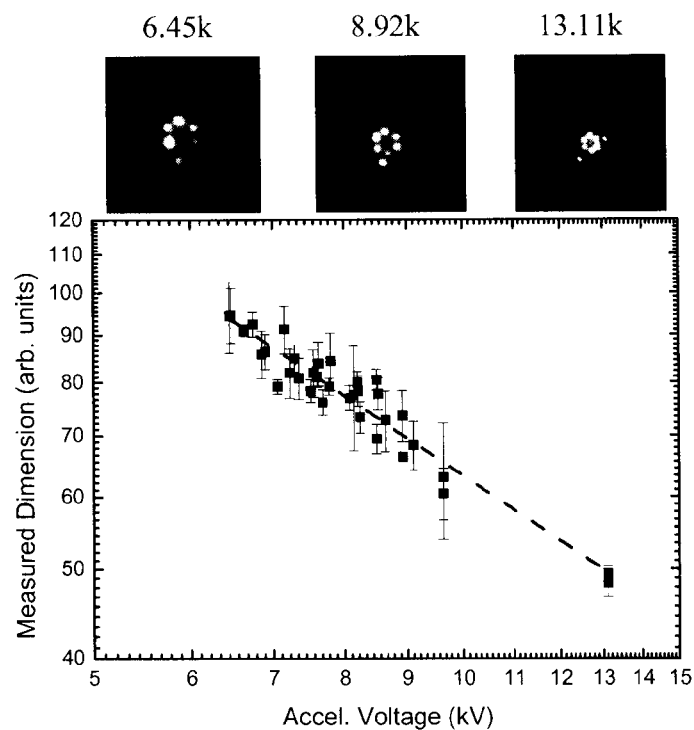
FIG. 12 shows the hexamer dimension various tips prepared at different acceleration voltages.
Figure 13:
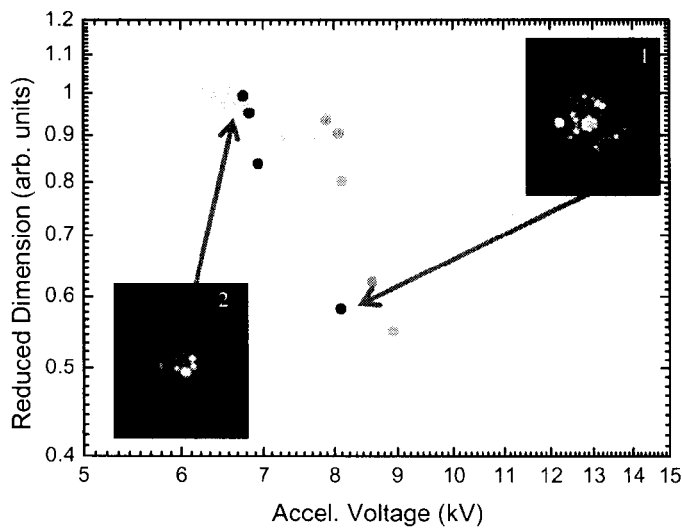
FIG. 13 shows the magnification change of the tips as the etching process continues.

It is also evident that the spot size is quite different for the two single atom tips shown in FIG. 11. We explored pattern sizes of nanotips by comparing multiple tips and carefully measuring the magnification of each image. We used the atom spacing dimensions of a seven atom pattern (a hexamer with a central atom) to determine magnification rather than SAT spot size/profile in order to avoid uncertainty in spot size due to under or overexposure of the image. The hexamer structure is closely related to the single atom tip as the central atom will eventually become the SAT. The size was determined as the average distance between opposite spots in the hexamer in order to account for possible asymmetries. The data are plotted in FIG. 12 and each square represents a separate tip measurement. Three representative hexamer images are also shown for comparison, along with the beam energies associated with each image. The figure shows that there is a relationship between pattern size and beam energy, with higher voltage patterns having a more compact grouping of atoms in the image. The measured beam voltage was determined by the potential difference between the tip and the front plate of the MCP. The representative images show this effect directly as the 13 kV image displays a compact group of six, while the 6.45 kV image shows a broader arrangement of atoms in the hexamer. A fit of the data shows that it is related by $\sim V^{-0.9}$. This change in magnification shows that the controlled etching procedure that forms the nanotip can alter the shape of the base of the emitter in a controlled manner. We also evaluated the magnification change of the tips during the process of etching. FIG. 13 shows the reduced magnification of two separate tip etching experiments, along with the trend in magnification from FIG. 12 (the thick cyan line indicates the range of the hexamer dimensions). In this case we have normalized the pattern sizes to allow for the direct comparison of the magnified images at a common acceleration (beam) voltage in order to evaluate the effect of the tip shape.

In this experiment a hexamer structure was identified and measured on a larger tip base (FIG. 13, inset 1). The etching procedure was then used to remove the remaining atoms from around the hexamer. It was found that the magnification alters with the etching process; The reduced pattern size measured at inset (1) is 58% of that of the pattern at inset (2) and the slope of the data far exceeds that of the experimental data represented from FIG. 12 (thick cyan line). This leads to the conclusion that the local atomic structure of the nanotip has a large influence on the magnification of nanotips.

Improving Resolution of Atomic Force Microscopy (AFM) by Using Etched Nanotips.

Figure 14:
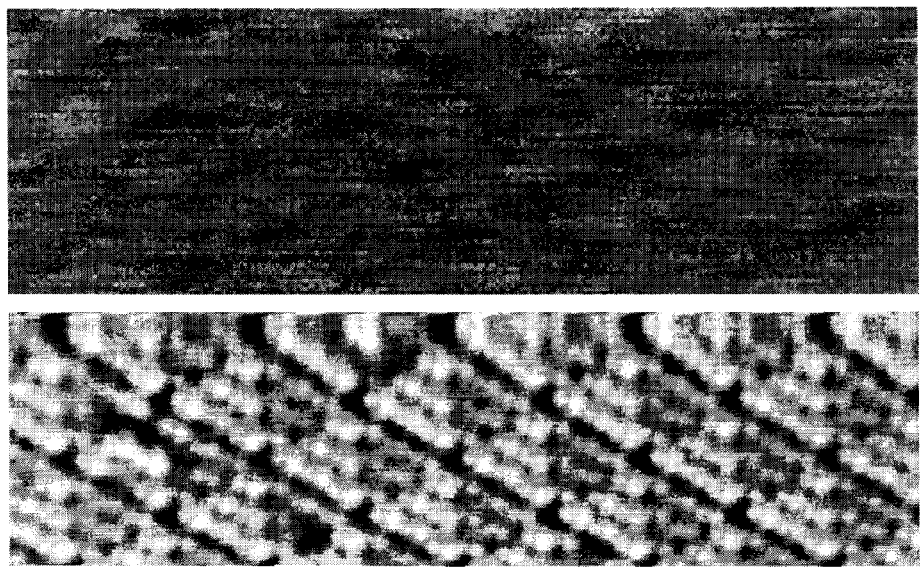
FIG. 14 shows AFM images of Si(111) 7×7 using a regular and etched nanotip.

A tip was attached to a non-contact atomic force microscope cantilever. The cantilever was formed from a quartz tuning fork to achieve the oscillation. The AFM mode of measure used the Q-plus method. The tip was etched using the constant field method of tip formation to prepare a high aspect ratio tip. Without removing from vacuum, the tip/cantilever assembly was installed in the scanning probe microscope. An image was acquired in the non-contact mode of measurement (see FIG. 14). The image is compared to an image obtained by the same tip, prior to etching. The imaging setpoint parameters were −9 Hz for the upper image and −1.7 Hz for the lower. The images are scaled the same. The upper image shows poor resolution despite a larger force being used to sense the surface and is attributed to a broader tip.

Improving Coherence Properties of a Low-Energy Electron Point Source (LEEPS) Microscopy.

Figure 15:
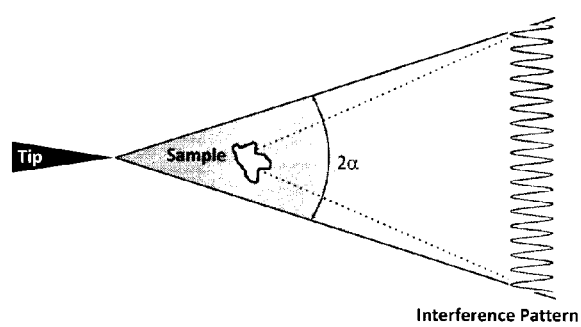
FIG. 15 shows a schematic diagram of LEEPS microscope.

The LEEPS microscope is shown schematically in FIG. 15 and consists of only a source, a sample and a detector. The coherent electron wave scatters off the sample and interferes with the reference wave at the detector to create a hologram. The width of the interference pattern is a measure of the width of the coherent wavefront emitted by the tip. As in any microscope, the numerical aperture dictates the resolution. In a LEEPS microscope, the coherence angle, α, is dictated by the character of the source. The diffraction limited resolution, R, of the LEEPS microscope is given by:

$$R \geq \lambda/2 \sin \alpha, \quad (eq. 4)$$

where λ is the wavelength of the incident electrons.

Figure 16:
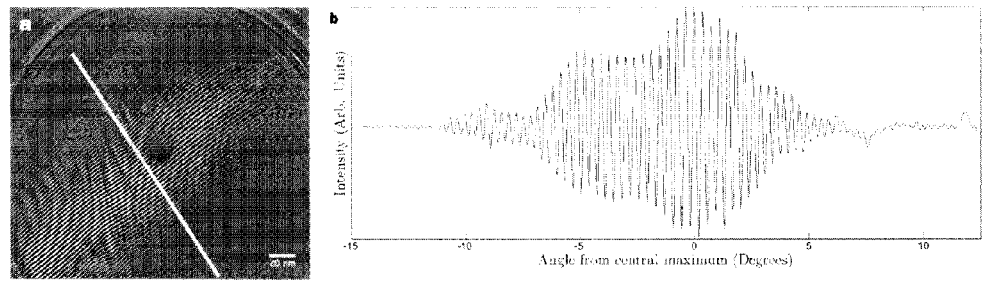
FIG. 16 shows an interference pattern from LEEPS experiments using a nanotip.

The nanotip in this work is made by removing material from the shank of the tip, rather than building a sharp protrusion upon a broad base. This results in a tip with a higher aspect-ratio. The electron emission is expected to be broader for a higher aspect-ratio tip, since an emitter with a larger radius of curvature will focus the emission into a narrow beam. Lastly, the nature of the surface of the tip itself may play a role. As the tip is etched, a protective nitrogen-rich coating remains which modifies the work function of the tip, this through a proximity effect, may play a subtle role in tuning emission character of the tip. When a high aspect ratio SAT, prepared by a constant-field method, is utilized in LEEPS, it exhibits superior coherence properties as well as large numerical aperture. The coherence angle (α shown in FIG. 15) was measured simply by calculating [M. Scheinfein, W. Qian, J. Spence. J. Appl. Phys. 73, 2057, 1993], $$\tan^{-1}(w/2L) \quad (eq. 5)$$

where w was the width of the pattern on the MCP and L was the tip-MCP distance. The maximum coherence angle for these interference patterns (as shown in FIG. 16) was 14.3±0.5°.

Using $R_v \cong \lambda/\pi\alpha$, these measurements yield a virtual source size of 1.7±0.6 Å. Additionally, the upper-bound on resolution of the LEEPS microscope can be estimated using Eq. 4. From this we expect a resolution of 2.6±0.6 Å.

Automatization of the Nanotip Fabrication Using the Etching Method.

In the other embodiment of the invention the SAT fabrication process is carried out automatically by employing computer control and pattern recognition algorithm. In one example of an automated system, the following procedure was followed:

The tip is cooled to liquid nitrogen temperatures in an FIM.

The predefined voltage ramp and predefined partial pressure is set to start the etching process. This voltage ramp is dependent on the desired final tip shape.

With a starting voltage of 15 kV, the voltage is ramped down at 1 V/s with a partial pressure of nitrogen at 1e-6 Torr. The FIM pattern is continuously monitored and analyzed using a pattern recognition algorithm to detect specific features. When predefined features are detected, the voltage ramp/etching gas pressure is changed.

Initially, the radius of the tip is monitored by measuring the distance between two crystallographic directions, e.g. [111] and [110]. As the radius of the tip contracts, measuring the distance between indices is not reliable as the tip shape is too small.

Etching continues until the central hexamer is dominant with only a few additional atoms. Pressure of reactive gas is set to minimum and voltage ramp is stopped. Hexamer structure is recorded for future reference.

Short voltage pulses are applied to selectively remove unwanted atoms.

Field evaporation driven by voltage pulses removes six atoms leaving central atom at the apex of the tip. In other examples, low pressure gas assisted etching is used to remove the last atoms from the hexamer.

The control of the parameters can be based on software-based pattern recognition.

In another example, a curved tip was prepared using following parameters:

voltage profile: [17 kV→16 kV (1000 s)→17 kV (10 s)] repeated ten times.

He pressure: 1e-5 torr $N_2$ pressure: 1e-6 torr

Figure 17:
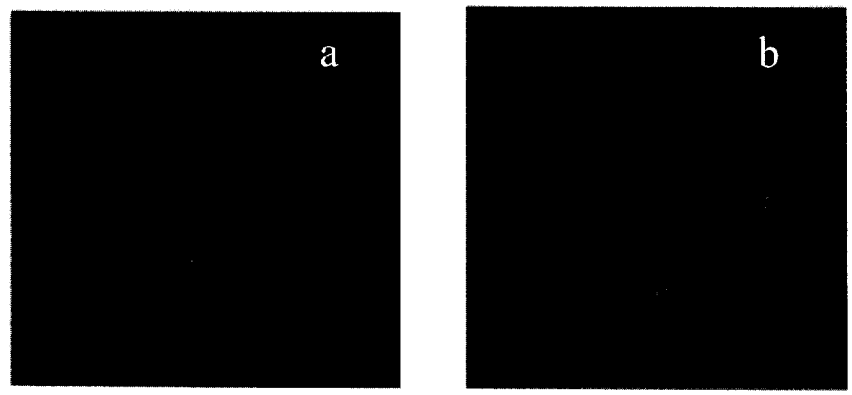
FIGS. 17a (initial tip) and 17b (after cleaning) demonstrate effects of tip cleaning using a saw-tooth voltage profile.

The FIM pattern changed from narrowly confined (see FIG. 17a) to a broad, screen-filling one signifying a nearly hemispherical tip apex (see FIG. 17b). Note that edges of VIM pattern are limited by the extractor opening.

A saw-tooth voltage profile was used to alternately etch and evaporate tip end-atoms. The saw-tooth profile serves to cycle between a field evaporation mode where field evaporation is predominant, when the voltage is high, and an etch mode where the chemical etching is predominant, when the voltage is low. The field evaporation mode tends to create the broad round tip, whereas the etching mode cleans the tip by removing crystal defects.

The cycling between modes in this manner, in particular by using a saw-tooth voltage profile, makes it possible to achieve consistent starting points for tips that are not well defined or defective. Broad, clean precursor tips made by this method are consistent and have well defined radii. These tips can then be sharpened using the process described in U.S. Pat. No. 7,431,856 with the additional control described herein to determine the overall final shape of the tip. It should be pointed out that other voltage profiles, such as sinusoidal, could be used to achieve this cyclical process with a similar effect.

The alternate cycling between the field evaporation mode and etching mode, for example using the saw-tooth voltage profile, can also be used to clean up working tips that have some crystal defects or incomplete FIM patterns. This has been found to have a similar effect to annealing but without any of the adverse effects of heat treatment such as tip blunting.

The low limit voltage is an important parameter in this process. It typically has to stay within 5-10% of the field evaporation voltage. If the amplitude of the saw-tooth voltage profile is too large, the FIM pattern may shrink which may be undesirable in some cases.

Rebuilding Nanotips and SATs In Situ.

Figure 18:
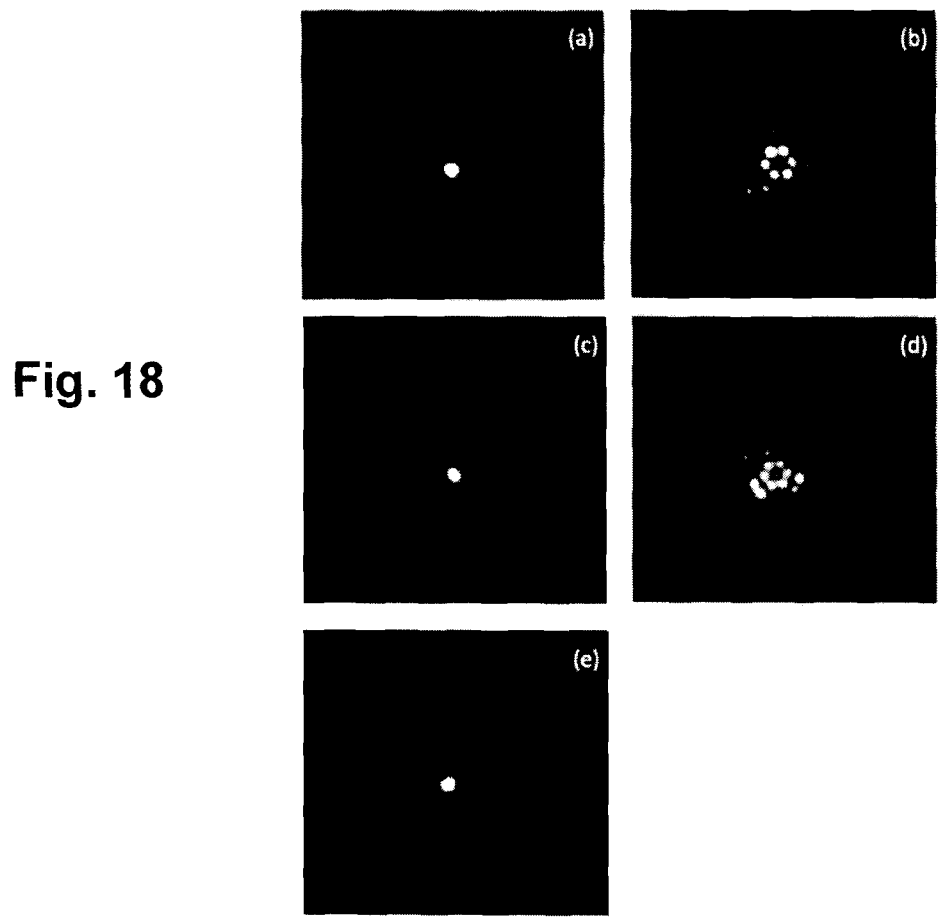
FIG. 18 shows a sequence of tips being rebuilt along a single axis.

Similar techniques used to fabricate a tip can be used to rebuild it in situ. FIG. 18 shows a method of rebuilding a nanotip along a single axis. A) An SAT. B) The tip was evaporated to reveal a hexamer. C) Etching to an SAT. This SAT lies along the same crystalline axis as that in (A). D) The tip was again evaporated to a hexamer. E) Etching to an SAT. This SAT lays along the same crystalline axis the two other SATs.

Figure 19:
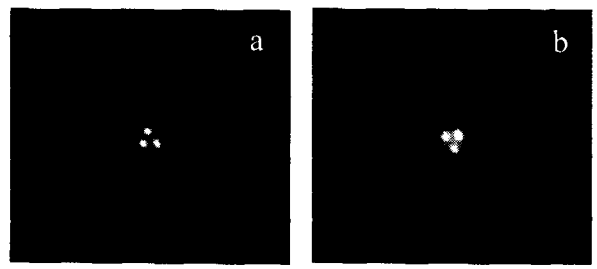
FIG. 19 shows two W(111) trimer configurations.

By preparing the SAT with an atom on the central axis as opposed to one of the trimer atoms, the alignment of the ion beam remains unchanged. This is advantageous over systems that rely on trimer formation where the selection of a single atom of a trimer requires that the source be tilted in order to achieve alignment. Realignment would also be required for any tip rebuilds. FIG. 19 compares rebuilds of trimer tips showing that two available trimer configurations leading to multiple orientations for the gun alignment and increasing the product complexity.

This shows that the tips that degrade and/or fail during use can be restored in situ by performing the novel process within an operating SIM to restore the tip to a single atom point while maintaining alignment of the tip axis within the microscope. This in practice is a very important advance. The final atom is aligned along the crystalline direction of the tip and all rebuilds of SATs are aligned along that same direction. This will reduce the requirement of source realignment with the axis of a scanning electron microscope when tip reformation is required and represents a clear advantage over trimer tips. There is also a clear advantage of W(111) over W(110) on which multiple equivalent structures can be found, leading to multiple nano-structures at the tip apex.

Surface Passivation to Improve Overall Performance of SAT.

The gas-assisted etching inherently provides passivation of the emitter surface. In some implementations an engineered chemical coating can also be incorporated. It is an important part of enhancing the efficiency of GIFSs based on atomically defined tips.

Figure 20:
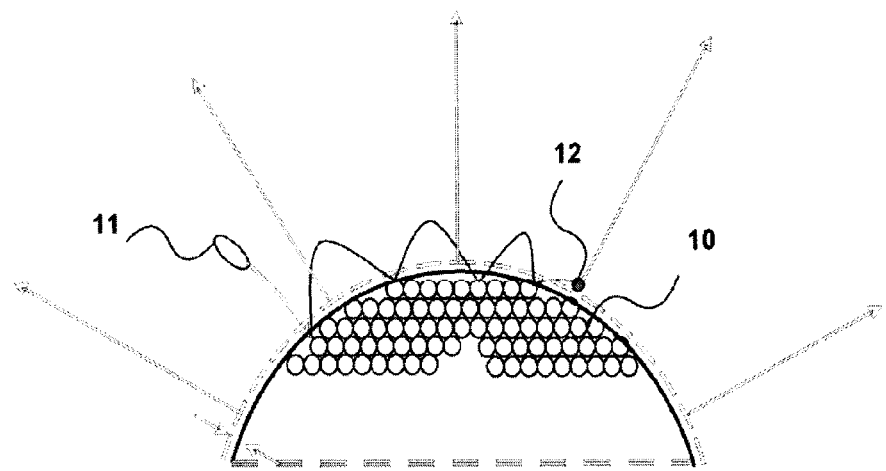
FIG. 20 is a schematic diagram of FIM imaging process.

The coating improves thermal accommodation of the imaging gas which, in turns, leads to: narrowing of the ion beam spread (divergence angle) due to colder imaging gas. This is explained by a reduced transverse velocity of the gas atoms prior to ionization. Furthermore, faster thermal accommodation increases the capture probability which increases the total ion current. A combination of the two points leads to enhancement of angular current density and hence source brightness. FIG. 20 is a detailed view of a tip wherein the tungsten atoms are shown as 10 and the polarized helium atoms as 11, ionized helium atoms at the critical distance as 12. The passivation of the tip enhances thermal accommodation of the imaging gas (helium) and reduces the number of bounces to achieve thermal accommodation compared to a clean tungsten tip.

The surface passivation also protects the emitter surface from further chemical reaction that degrades the performance of the emitter, including, current fluctuations, and tip failure leading to reduced lifetime.

One example of coating effect is observed in electron field emission experiments. The performance and stability of electron field emission from atomically sharp (unetched) tips can be tested with and without said coating. It demonstrates usefulness of chemically altering surface of the electron source to improve its performance.

Experimental details for the passivation process:

i) Introducing ammonia into a vacuum system up to 2e-6 torr;

ii) Flashing W tip to ~1200 C. to expose fresh tungsten surface;

iii) Lowering temperature to 900 C. for 2 minutes; and iv) Pumping out ammonia and lowering temperature to 800 C. for additional two minutes.

The nitrogen passivation was tested using electron field emission. It is well documented in published literature and observed in our experimental set up, that electron field emission of a fresh tungsten tip decreases over a period of time (minutes to hours depending on the vacuum level in the test chamber). The decrease is attributed to formation of an adsorbed layer of vacuum contaminants hampering field emission properties of the source. After the initial decrease, field emission is stable for hours (up to one day) before it becomes increasingly unstable. At this point, the tip can be refreshed by a heat pulse to recover clean tungsten surface again and the entire cycle repeats.

The passivated tips created by the described process did not suffer electron emission loss after tip cleaning. The overall emission currents were lower in agreement with increased work function of tungsten-nitrogen coating over a clean tungsten surface. The emission current eventually became unstable in similar manner as for the clean tungsten tip experiments. After thermal treatment to refresh the tip (~900 C. for several seconds) the emission current was restored without the initial drop as observed for the clean tungsten tips suggesting that the tungsten-nitrogen coating remained intact.

The stability of the tungsten-nitrogen coating was tested by flashing the treated tip to a higher temperature until emission current drop was observed, at which point a clean tungsten surface has been exposed. The experiments indicate that flashing temperature around 1200 C. still preserves tungsten-nitrogen coating on the tip. There is some indication that irreversible changes occur after extensive heating at 1200 C. Flashing temperatures above 1500 C. was required to remove tungsten-nitrogen coating. Even at this temperature the disintegration of the protective layer was not instantaneous. Clean tungsten surface was observed after keeping the tip temperature at 1500 C. for at least 60 s.

Figure 21:
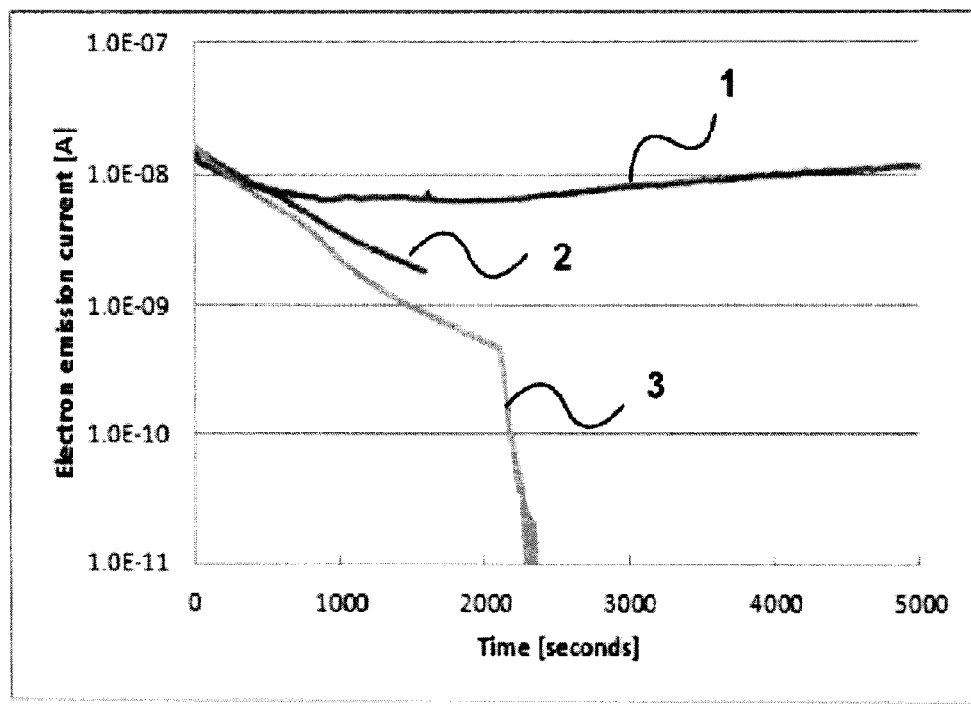
FIG. 21 shows electron emission current time traces with and without a coating on the tip.

FIG. 21 shows electron emission current time traces. Line 2 represents a clean tungsten tip with V_extraction=3.8 kV, line 1 shows improved stability after the above-described treatment, V_extraction=4.1 kV, and line 3 shows what happens after heat treatment at 1500 C. to remove the coating layer and restore clean tungsten emission behavior, with V_extraction=3.8 kV.

Another Example of Surface Protection by Passivation was Shown Through Experiments Involving Air Exposure.

Figure 22:
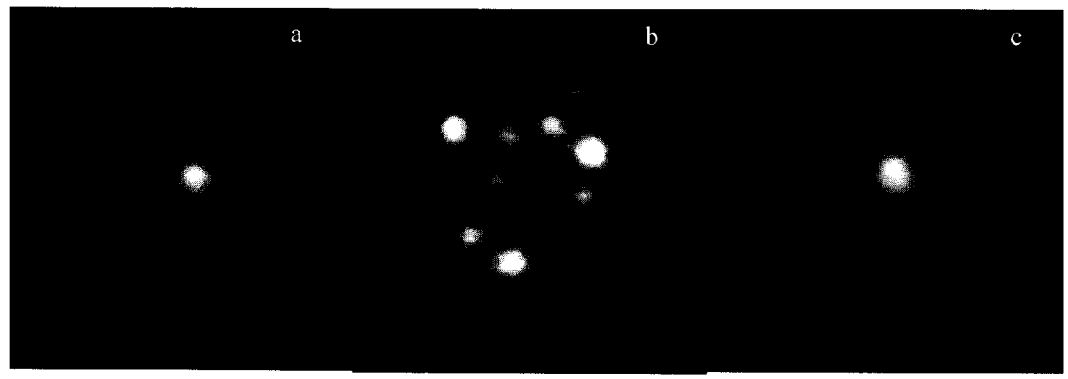
FIG. 22 shows air exposure and SAT recovery.

A single-atom tips operating at 6.3 kV (FIG. 22*a*) was allowed to warm up overnight and was exposed to atmospheric conditions. No voltage bias was applied to the tips while in air. After the vacuum system was baked in order to return to ultrahigh vacuum conditions, the tip were cooled down, the imaging gas, helium, was introduced to $1\times10^{-5}$ Torr and the voltage was slowly ramped up until a hexamer pattern was observed at 7.5 kV (FIG. 22b) which enabled us to readily re-etch the tip apex down to a single atom configuration (FIG. 22c). The best image voltage for the resulting single-atom tip was 7.2 kV, only slightly higher than the initial one. This proves that single-atom tips are robust enough to withstand the adsorption of air molecules and that recovery is feasible after air exposure with minimal intervention on the part of the experimentalist.

This would allow for SATs to be fabricated in field ion microscopes and thereafter transferred to specific machines where they would undergo conditioning procedures prior to operation.

Additional Tip Shaping Through Thermal Treatment of the Nitrogen Passivated Nanotips.

Figure 23:
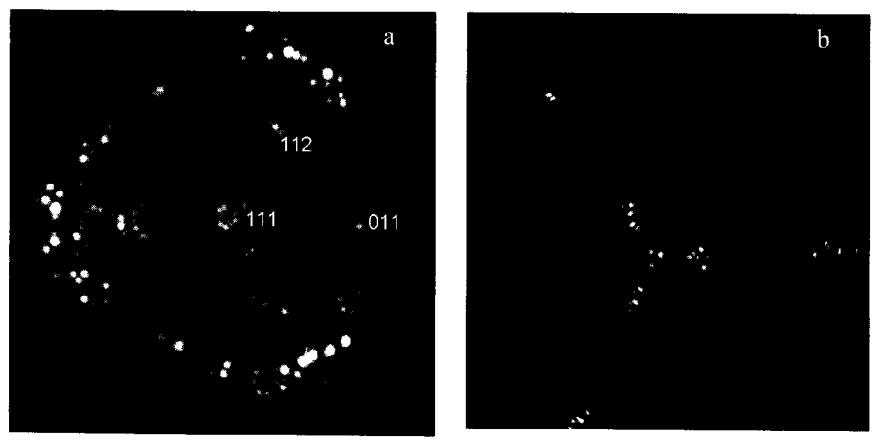
FIG. 23 shows base shaping using $N_2$ passivation and heating.

Once a nanotip is prepared through the procedures described above, a passivating layer of nitrogen remains. This layer has been shown to create robust tips and limit tip degradation due to atmospheric exposure. The layer can also be utilized to help alter the shape of the tip apex. In the following experiment, a single atom tip was imaged at 10 kV. After annealing to 1300 C., high voltage was again applied to the tip in order to image using the FIM. The tip had been altered and now required 19 kV in order to generate an image indicating that the tip had become broadened. The image showed three ridges radiating symmetrically indicative of a faceting phenomenon. A flattening of the crystallographic planes corresponding to the <211> directions (FIG. 23a) appears to have occurred as ridges along the lines connecting the apex (111) plane and {011} planes became visible (FIG. 23b). This modified tip now operates at a higher voltage and can be etched further to prepare single atom emitters.

The invention claimed is:

1. A method of fabricating a nanotip, comprising:
    modifying a precursor nanotip having an apex and a shank by applying an electric field in the presence of a reactive gas to perform field-assisted etching wherein atoms are preferentially removed from the shank by chemical interaction with the reactive gas; and
    controlling the reactive gas pressure and/or tip voltage to vary the electric field so as to promote field evaporation of apex atoms during fabrication of the nanotip and thereby control the overall profile of the resulting nanotip.

2. A method as claimed in claim 1, wherein the field evaporation of apex atoms and field assisted etching of shank atoms are performed at least partly simultaneously.

3. A method as claimed in claim 2, wherein as etching progresses the tip voltage is lowered at a ramp rate that allows some field evaporation of apex atoms to occur so as to provide said simultaneous field evaporation of apex atoms and field-assisted etching of shank atoms.

4. A method as claimed in claim 1, wherein the field evaporation and field-assisted etching are performed sequentially in two distinct phases.

5. A method as claimed in claim 1, further comprising performing a subsequent step of inhibiting the field evaporation of apex atoms to promote field-assisted etching of the shank.

6. A method as claimed in claim 1, comprising a step of cycling through field-assisted etching phases and field evaporation phases to perform tip shaping.

7. A method as claimed in claim 1, wherein the reactive gas is nitrogen.

8. A method as claimed in claim 1, wherein the nanotip is coated with a coating to perform at least one of the following: lock up surface metal atoms, inhibit metal atom diffusion, protect the nanotip from further reaction, and increase thermal accommodation of the ion gas source.

9. A method as claimed in claim 8, wherein the coating results inherently from the nanotip field-assisted etching.

10. A method as claimed in claim 8, wherein the coating is selected from the group consisting of nitrogen and oxygen.

11. A method as claimed in 1, wherein the nanotip is made of tungsten.

12. A method as claimed in claim 1, wherein the nanotip is fabricated in a field ion microscope or scanning ion microscope to imaging of the nanotip during the fabrication process.

13. A method as claimed in claim 12, wherein the fabrication process is computer-controlled and the computer is configured to monitor a field ion pattern of the tip and control the tip voltage and etching gas pressure to achieve a predetermined pattern.

14. A method as claimed in claim 13, wherein the computer is configured to monitor the field ion pattern of the tip using pattern recognition software.

15. A method as claimed in claim 1, further comprising subjecting the fabricated tip to heat treatment to modify the overall tip shape.

16. A method as claimed in 15, wherein the tip is maintained at a temperature of approximately 1100-1400 C for 120 s.

17. A method of rebuilding nanotips within a scanning ion microscope (SIM) or field ion microscope (FIM), comprising:
    introducing an etchant gas into a vacuum chamber of the SIM or FIM with a nanotip in situ;
    etching the nanotip having an apex and a shank with a reactive gas in the presence of an electric field to preferentially etch the shank while maintaining tip alignment within the microscope; and
    controlling the reactive gas pressure and/or tip voltage to vary the electric field so as to promote field evaporation of apex atoms in order to control the overall profile of the final nanotip.

18. A method as claimed in claim 17, wherein the etchant gas is nitrogen.

19. A method of fabricating precursor nanotips or cleaning up nanotips, comprising:
    placing a sample tip with a shank and an apex in a vacuum chamber in the presence of an etchant gas;
    cyclically varying the voltage of an applied electric field to alternate between a field evaporation mode where field evaporation is predominant and an etching mode where chemical etching is predominant.

20. A method as claimed in claim 19, wherein the voltage is varied between an upper limit and a lower limit, and the lower limit remains within 5 to 10% of the upper limit.

* * * * *

UNITED STATES PATENT AND TRADEMARK OFFICE
CERTIFICATE OF CORRECTION

| | |
|---|---|
| PATENT NO. | : 9,102,190 B2 |
| APPLICATION NO. | : 14/346752 |
| DATED | : August 11, 2015 |
| INVENTOR(S) | : Jason L. Pitters, Radovan Urban and Robert A. Wolkow |

It is certified that error appears in the above-identified patent and that said Letters Patent is hereby corrected as shown below:

Title Page

That the third inventor's surname should read:

"WOLKOW" and not Wolcow

Signed and Sealed this
Seventh Day of June, 2016

Michelle K. Lee
*Director of the United States Patent and Trademark Office*